(12) United States Patent
Kim et al.

(10) Patent No.: US 6,456,850 B1
(45) Date of Patent: Sep. 24, 2002

(54) METHOD FOR PREVENTING OVERLOAD CONDITIONS IN COMMUNICATION SYSTEMS

(75) Inventors: Kyoung Kim, Bridgewater; Alexandro Federico Salvarani, Edison, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/375,892

(22) Filed: Aug. 17, 1999

(51) Int. Cl.[7] .................................................. H04Q 7/20
(52) U.S. Cl. ........................ 455/453; 455/423; 455/436
(58) Field of Search ................................ 455/418, 420, 455/422, 423, 436, 445, 453, 561

(56) References Cited

U.S. PATENT DOCUMENTS

| | | | | |
|---|---|---|---|---|
| 4,497,978 A | * | 2/1985 | Schoute et al. ................. | 179/9 |
| 4,670,899 A | * | 6/1987 | Brody et al. .................... | 379/60 |
| 5,594,740 A | * | 1/1997 | LaDue ........................... | 379/59 |
| 5,666,356 A | | 9/1997 | Fleming et al. ............... | 370/328 |
| 5,835,490 A | * | 11/1998 | Park et al. ..................... | 370/342 |
| 5,859,838 A | | 1/1999 | Soliman ........................ | 375/224 |
| 6,002,676 A | * | 12/1999 | Fleming ........................ | 370/328 |
| 6,240,287 B1 | * | 5/2000 | Cheng et al. ................. | 455/422 |

FOREIGN PATENT DOCUMENTS

JP 07046641 A * 2/1995 ............. H04Q/7/22

OTHER PUBLICATIONS

"Electronic Switching", Amsterdam, Elsevier Science Publication, NL, vol. 2, 1981, pp. 412–415, XP002130357.

* cited by examiner

Primary Examiner—Edward F. Urban
Assistant Examiner—Meless N Zewdu

(57) ABSTRACT

A method for preventing overload conditions in a communication system. The communication system performs a call load analysis and admits a subscriber requesting admission (or responding to a page) to the system based on the result of the call load analysis. The call load analysis is based on the signal to noise power ratios of all subscribers already admitted to the communication system. External jammer signals that interfere with subscriber signals thus reducing the coverage of the communication system do not affect the call load analysis. The jammer signals therefore, do not hinder an efficient use of the capacity of the communication system. A threshold value is established and such threshold value is compared to an average call load value calculated from a plurality of instantaneous call load values. When the calculated average call load value is substantially equal to or above the established threshold, no subscribers are admitted to the communication system; subscribers are admitted when the calculated average call load value is below the established threshold. Individual subscribers whose contributions to the average call load value are deemed significant (tending to cause or actually causing overload conditions) are identified and removed from the system.

26 Claims, 3 Drawing Sheets

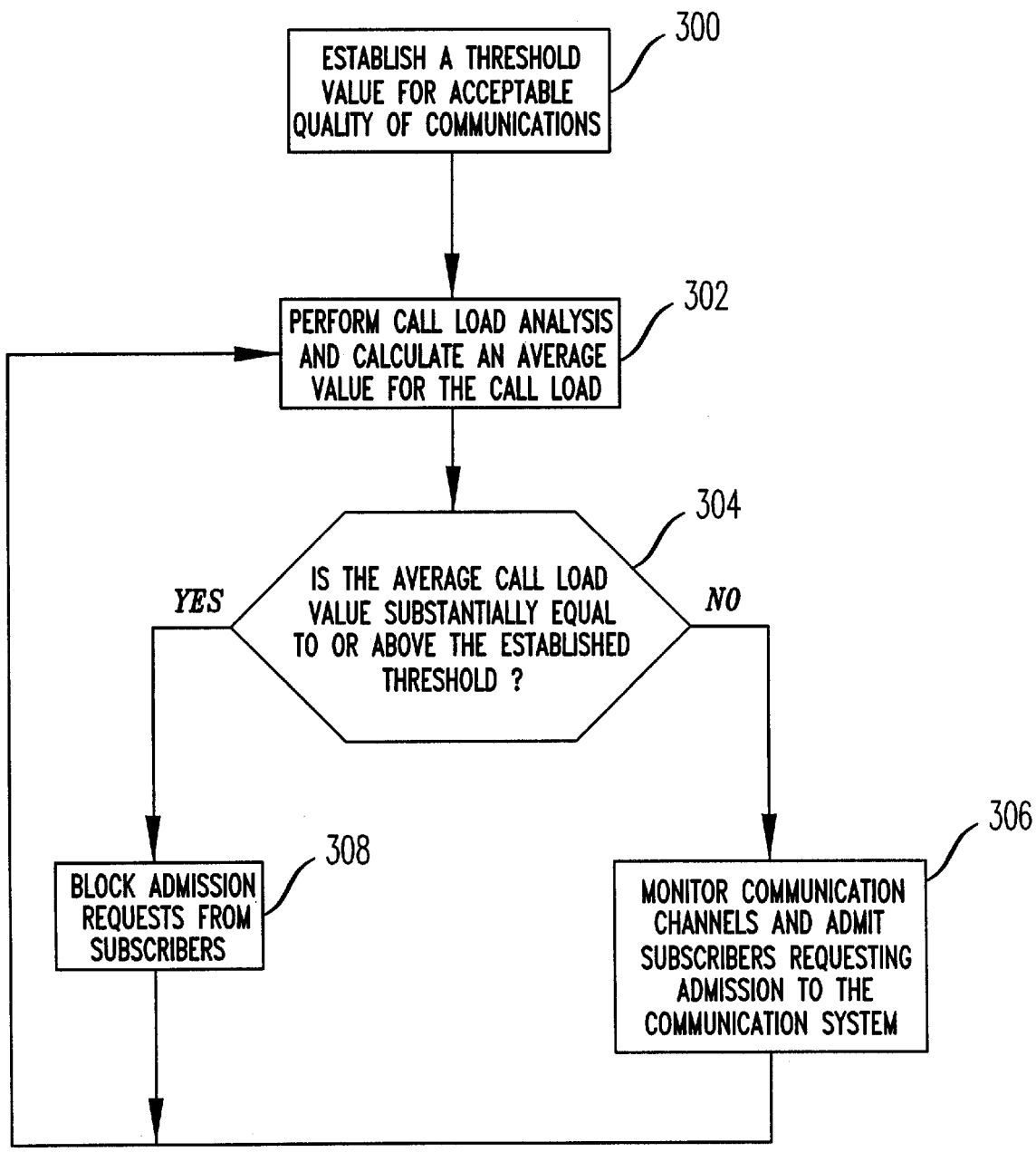

METHOD FOR PREVENTING OVERLOAD CONDITIONS IN COMMUNICATION SYSTEMS

BACKGROUND OF THE INVENTION

1. Field of the Invention

The present invention is generally related to a method for efficiently controlling access to a communication system and in particular to a method for preventing the occurrence of overload conditions in a communication system by controlling the amount of users having access to the communication system.

2. Description of the Related Art

Communication systems, and in particular, wireless communication systems comprise a plurality of communication channels through which subscribers of such systems communicate with each other and with the system. Wireless communication systems such as Code Division Multiple Access (CDMA) systems and other communication systems have a certain capacity; that is they are limited by the amount of communication channels that can be made available to subscribers of such systems. The capacity of a communication system is the amount of information per unit time (i.e., information rate, R) that can be conveyed (within the system) while maintaining an acceptable quality of communications. The acceptable quality of communications is typically defined by the operator of the communication system. Usually, the capacity is directly related to the number of subscribers using the system; the more subscribers using the system the higher the information rate.

Referring to FIG. 1 there is shown part of a typical topology of a cellular CDMA wireless communication system. The communication system depicted in FIG. 1 comprises a plurality of cells each of which delineates a particular geographical area or terrain that is covered by the communication system. The; cells have borders which form hexagons. The hexagons (108, 114, 110, 112) symbolically represent areas of coverage within which subscribers located in the same cell communicate with the cell (i.e., cell system equipment). Each cell has system equipment (owned and controlled by a system operator) that are used by the system to admit subscribers to the system; that is to allow subscribers of the system to gain access to the communication system for communicating with each other and/or with the system. At least part of the system equipment is typically located at a base station (e.g., 100, 102, 104, 106). Some of the system equipment at the base stations are Radio Frequency (RF) transmitters and receivers for conveying (i.e., transmitting and receiving) communication signals.

Other system equipment, which can also be located at a base station, provide the Operations, Administration and Maintenance (OA&M) services typically associated with communications equipment. For example, subscriber billing, allocating communication channels for subscribers, and giving subscribers access to the communication system are some of the services provided by the OA&M equipment. Subscribers given access to the communication system can communicate with other subscribers via the cell's base station.

For a CDMA communication system, such as the one depicted in FIG. 1, a subscriber gains access by making a request to system equipment (usually located at a base station). For example, subscriber 124 in cell 112 makes a request to base station 100 to have access to the communication system. System equipment at base station 100 receive the request and decide whether to give subscriber 124 access to the communication system. Subscriber 124 and base station 100 (as well as other base stations and subscribers) communicate via communication channels called forward links and reverse links. The forward link is a communication channel through which base station 100 transmits communication signals to subscriber 124. The reverse link is a communication channel through which subscriber 124 transmits communication signals to base station 100. Thus, each subscriber has a forward link and a reverse link that it uses to communicate with system equipment and/or with other subscribers of the communication system.

Typically, the system decides to provide access to a subscriber by performing a power level analysis that attempts to maintain the quality of communications between subscribers at an acceptable level as defined by the system operator. The system could continue to admit subscribers requesting communication services (or responding to a system request or "page" to admit subscribers) and thus keep increasing its information rate. At some point an overload condition will occur causing the quality of communications provided by the communication system to be degraded. An overload condition occurs when the quality of communications (e.g., existing voice and/or data calls) drops below an acceptable level set by the system operator. Usually the acceptable level is set as a threshold below the system's ultimate capacity. One example of an overload condition is when a cell communicates with a relatively large number of subscribers such that the system cannot meet the desired signal to noise ratio (SNR) requirement. The number of subscribers that can be adequately serviced by a cell depends on the SNR usually expressed in terms of a ratio, $$\frac{E_b}{N_t},$$

where $E_b$ represents the total received signal energy per unit of information (e.g., energy per bit) and $N_t$ represents the total noise power density. The higher the $$\frac{E_b}{N_t}$$

of the signal measured at a receiver, the better the quality of communications.

The following equation defines the reverse-link signal to noise ratio $$\left(\frac{E_b}{N_t}\right)^m_{i,k}$$

for subscriber i in cell k as measured by cell m:

$$\left(\frac{E_b}{N_t}\right)^m_{i,k} = \frac{\left(\frac{W}{R}\right)_{i,k} \times S^m_{i,k}}{N_{th} + J + \sum_{\substack{j=1 \\ j \neq i}}^{M_k} v_{j,k} S^m_{j,k} + \sum_{\substack{l=1 \\ l \neq k}}^{L} \sum_{j=1}^{M_l} v_{j,l} S^m_{j,l}} \quad (1)$$

The indices i and j designate particular subscribers and the indices k, l and m designate particular cells. $M_l$ is the number of subscribers in cell l, $M_k$ is the number of subscribers in cell k, L is the total number of cells in the system, is called the processing gain for subscriber i in cell k where W is the bandwidth of a CDMA carrier signal and R is the data rate, as defined previously. The average power of the reverse-link signal is defined as the product of the power level (S) and the voice activity factor (v) of the reverse-link signal. In equation (1) above, $S_{i,k}^m$, is the power level of the communication signal of subscriber i in cell k as measured at cell m, and the voice activity $v_{i,k}$ represents how often subscriber i in cell k speaks during a telephone conversation or how often a data energy burst is transmitted by the subscriber. $N_{th}$ represents the power level of thermal noise typically generated in electrical and electronic circuitry. J represents the power level of any jammer signal, which is a type of interference. Any signal other than a subscriber's communication signal is called interference. Two major sources of interference are thermal noise and jammer signals. For example, an external jammer interfering with a CDMA communication system is an analog mobile telephone user transmitting signals whose frequency spectrum is partially or entirely the same as the spectral band of the CDMA system; in such a situation the analog mobile signal interferes with CDMA subscriber signals. The aggregate power received by a base station is due to thermal noise, external jammers, and the CDMA subscriber signals. Thus, the total received power through a particular reverse link of a base station, which is called the received signal strength indicator (RSSI), has three components. The RSSI measured by cell m is defined by the following equation:

$$RSSI^m \equiv N_{th} + J + \sum_{l=1}^{L}\sum_{j=1}^{M_l} v_{j,l} S_{j,l}^m \quad (2)$$

where the last term on the right-hand side represents the power of CDMA subscriber signals. Note that the RSSI increases when the number of subscribers increases, when the power due to jammer signals increases, and/or even when the thermal noise power increases.

A common and current practice in controlling system overload for the reverse link is to measure the increase in RSSI and decide, based on the RSSI rise, whether to admit to the system any subscriber requesting service. The measured RSSI is compared to a threshold and when this measured RSSI is substantially equal to or above the threshold, the system blocks additional access requests from subscribers. Such an RSSI based method assumes that a rise in RSSI is mainly due to the subscribers of the desired service.

Consequently, when the RSSI reaches a system operator defined threshold, no additional subscribers are admitted to the system. The flaw in this method is that many times a rise in RSSI due to external jammers is misinterpreted as being due to CDMA subscribers. Although an increase in RSSI due to external jammers should not affect the system's capacity, such an increase in RSSI does indeed affect the system's capacity when an RSSI based overload control method is used. A relatively strong jammer signal can trigger the overload condition prematurely reducing the system's reverse-link capacity; this is an inefficient use of the communication channels of the system in that no additional subscribers are admitted even when the system can definitely handle such subscribers.

Another problem with the RSSI based overload control method is that many times certain subscribers who are currently using the system have to significantly increase their signal power resulting in an increase in RSSI thus potentially decreasing the $$\frac{E_b}{N_t}$$

for most of the other subscribers. The proper solution to this problem would be to identify and remove those particular subscribers from the system so as to reduce or eliminate the overload condition caused by such subscribers. However, the subscribers causing the rise in RSSI cannot be identified as their contribution to the RSSI cannot be separately identified and attributed specifically to them.

What is therefore needed is a method for substantially preventing overload conditions in a communication system based on the measurement of the signal power of the subscribers currently using the system and noise power which method is not adversely affected by the existence of external jammer signals. What is also needed is a method for substantially preventing overload conditions in a communication system by identifying and removing from the system specific subscribers currently using the system who are providing relatively large contributions to the overall interference power.

SUMMARY OF THE INVENTION

The present invention provides a method for substantially preventing overload conditions in a communication system based on a measurement of signal power and noise power called the call load which is associated with each of the subscribers using the system. The call load is independent of any interfering signals (e.g., external jammer signals). The contribution to the call load from each of the subscribers can be separately identified allowing a system operator and/or system equipment to alleviate overload conditions by removing from the system those subscribers deemed to be causing an overload.

In particular, the method of the present invention comprises establishing a threshold value for acceptable communications. Then, a call load analysis is performed from which an average call load value is calculated. When the average call load value is below the established threshold, communication channels are monitored for any subscribers requesting admission to the communication system and such subscribers are admitted. When the average call load value is substantially equal to or above the established threshold, subscriber admission requests are blocked and such subscribers are not admitted to the communication system. Admitted subscribers whose contributions to the call load are deemed significant or whose contributions tend to cause an overload condition are identified and removed from the communication system.

BRIEF DESCRIPTION OF THE DRAWINGS

FIG. 3 is a flow chart of the method of the present invention.

DETAILED DESCRIPTION

The present invention provides a method for substantially preventing overload conditions in a communication system based on call load. The call load depends on the aggregate of the signal and interference power contributions of subscribers using the communication system to convey information. The call load allows the system to determine whether to admit new subscribers to the communication system regardless of the power level of any interfering jammer signals being detected by the communication system. Further, the contribution to the call load from specific subscribers can be identified by the system allowing the system to identify and, if necessary, remove any subscriber that is deemed to be causing or contributing significantly to an overload condition.

Figure 1:
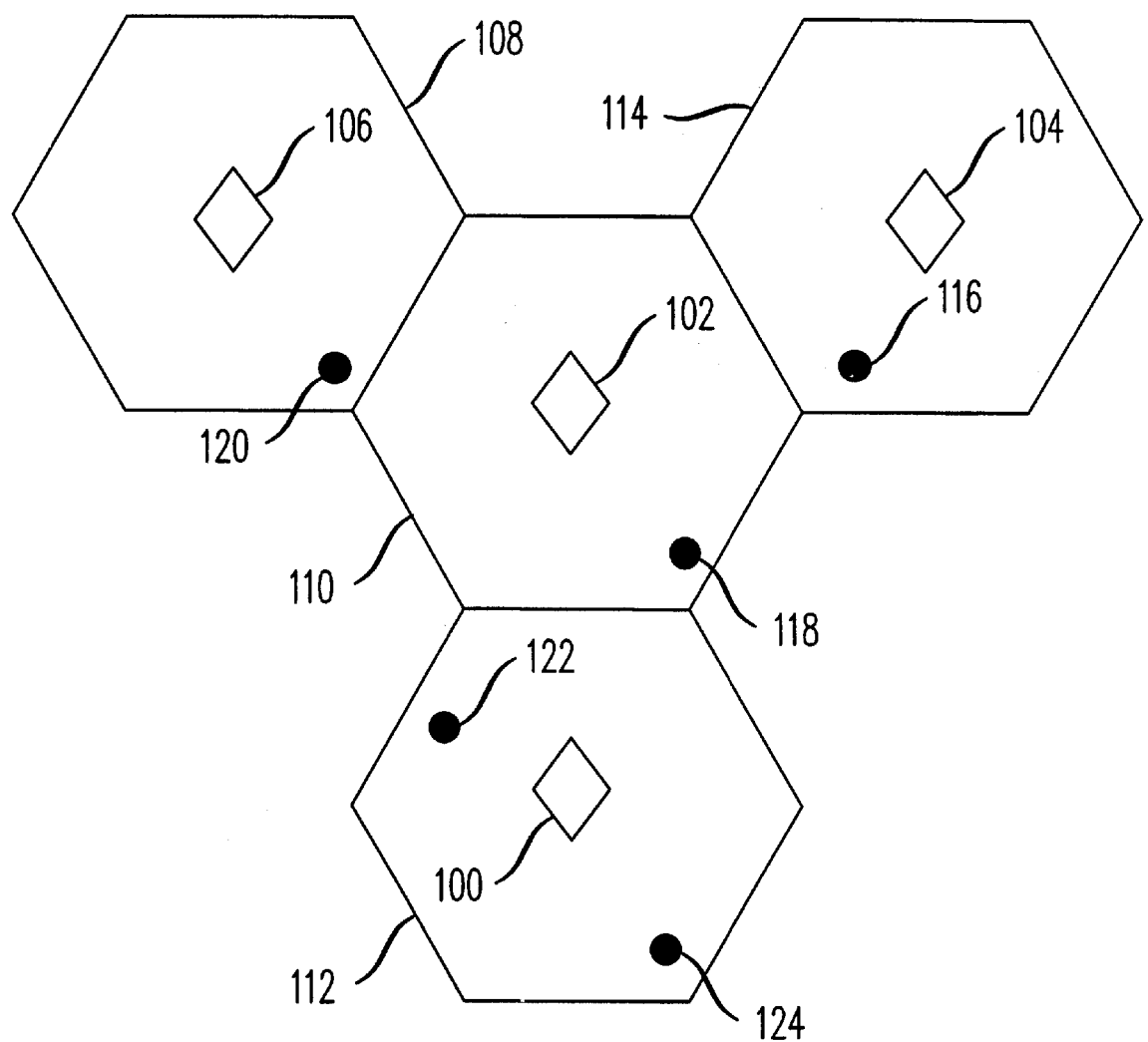
FIG. 1 depicts a typical topology of part of a cellular communication system.

In particular, for a particular cell of a CDMA wireless communication system such as cell 112 of FIG. 1, the method of the present invention has system equipment at base station 100 establishing a threshold value for acceptable communications between subscribers and base station 100 in cell 112. Then, the system equipment perform a call load analysis from which an average call load value is calculated. When the average call load value is below the established threshold, reverse links for cell 112 are monitored for any subscribers requesting admission to cell 112 and such subscribers are properly admitted. When the average call load value is substantially equal to or above the established threshold, subscriber admission requests are blocked and such subscribers are not admitted to cell 112. It should be noted that the method of the present invention is discussed and explained in the context of the wireless CDMA system depicted by FIG. 1; this is done for ease of explanation and illustrative purposes only. The method of the present invention is applicable to all types of wireless communication systems.

Referring now to FIG. 3, there is shown the method of the present invention in which system equipment (e.g., equipment at base station 100 in FIG. 1), in step 300, establish a threshold value for acceptable communications. The threshold value is based on the desired call load value that the system operator has determined that cell 112 can handle and still provide acceptable communications for subscribers assigned to or located in cell 112. The system operator has the ability to modify the threshold value based on various factors. For example, at certain time periods during the day, the demand for communications services for cell 112 is relatively high and thus, during such periods, the system operator lowers the threshold value to accommodate more subscribers but accepting a lower quality of communications. Also, certain cells may be located in relatively densely populated metropolitan urban areas and thus the system operator may establish a threshold value to meet such a demand while still providing acceptable communications. In essence, the threshold value depends on the system operator's definition of acceptable communications.

In step 302, the system equipment perform a call load analysis by calculating instantaneous call load values for the system. The system equipment further calculates an average value for the call load from the plurality of instantaneous call load values. The definition of an instantaneous call load is based on $$\frac{E_b}{N_t}.$$

For ease of reference, equations (1) and (2) are reproduced below:

$$\left(\frac{E_b}{N_t}\right)^m_{i,k} \equiv \frac{\left(\frac{W}{R}\right)_{i,k} \times S^m_{i,k}}{N_{th} + J + \sum_{\substack{j=1 \\ j \neq i}}^{M_k} v_{j,k} S^m_{j,k} + \sum_{\substack{l=1 \\ l \neq k}}^{L} \sum_{j=1}^{M_l} v_{j,l} S^m_{j,l}} \quad (1)$$

$$RSSI^m \equiv N_{th} + J + \sum_{l=1}^{L} \sum_{j=1}^{M_l} v_{j,l} S^m_{j,l} \quad (2)$$

Substituting equation (1) into equation (2), we obtain the following relation:

$$RSSI^m = v_{i,k}\left(1 + \frac{\left(\frac{W}{R}\right)_{i,k}}{v_{i,k}\left(\frac{E_b}{N_t}\right)^m_{i,k}}\right) S^m_{i,k} \quad (3)$$

Defining $$Y_m \equiv \frac{RSSI^m}{N_{th}} \text{ and } Z_m \equiv \frac{RSSI^m}{N_{th} + J}$$

and using equations (2) and (3), we derive the following relation for $Z_m$:

$$Z_m = \frac{1}{1 - \sum_{l=1}^{L} \sum_{j=1}^{M_t} \frac{v_{j,l}\left(\frac{E_b}{N_t}\right)^m_{j,l}}{\left(\frac{W}{R}\right)_{j,l} + v_{j,l}\left(\frac{E_b}{N_t}\right)^m_{j,l}}} = \frac{1}{1 - X_m} \quad (4)$$

where $$X_m \equiv \sum_{l=1}^{L} \sum_{j=1}^{M_t} \frac{v_{j,l}\left(\frac{E_b}{N_t}\right)^m_{j,l}}{\left(\frac{W}{R}\right)_{j,l} + v_{j,l}\left(\frac{E_b}{N_t}\right)^m_{j,l}} \quad (5)$$

is the instantaneous call load for cell m. Thus, the instantaneous call load values are values calculated as per equation (5) at specific instances of time. It should be noted that from equation (5), the contribution to the call load from each of the subscribers (i.e., individual subscriber j (j=1, . . . , $M_t$) call load values, which is the summand in the term on the right-hand side of equation (5)) is known and each such contribution is stored by the system equipment. It should also be noted that the call load in equation (5) is expressed in terms of the sum of the call load from each and every subscriber served by the system; that is, both the call load from all the subscribers served by the cell that measures $X_m$ (i.e., cell m) and that from all the subscribers in cells other than cell m. The average call load value is updated based on the stored subscriber call load values.

It should be noted that the call load expression as represented by equation (5), the jammer power term, J, has vanished. The call load value calculation (based on equation (5)) of the method of the present invention can thus be used even when there are jammers present in the system; that is, the method of the present invention allows system equipment to admit (or not to admit) new subscribers based on $X_m$ and not RSSI.

A term $$Y_m \equiv \frac{RSSI^m}{N_{th}},$$

known as the power rise over thermal noise, satisfies the following relation:

$$Y_m = \left(1 + \frac{J}{N_{th}}\right) \times Z_m = \left(1 + \frac{J}{N_{th}}\right) \times \frac{1}{1 - X_m} \quad (6)$$

In the absence of external jammer signals (i.e., J=0), $Z_m$ is equal to the power rise $Y_m$ and the call load $X_m$ can be estimated by measuring the power rise $Y_m$ and using equation (6) with j=0; that is, $$Y_m = Z_m = \frac{1}{1 - X_m} \text{ or } X_m = 1 - \frac{1}{Y_m}.$$

Figure 2:
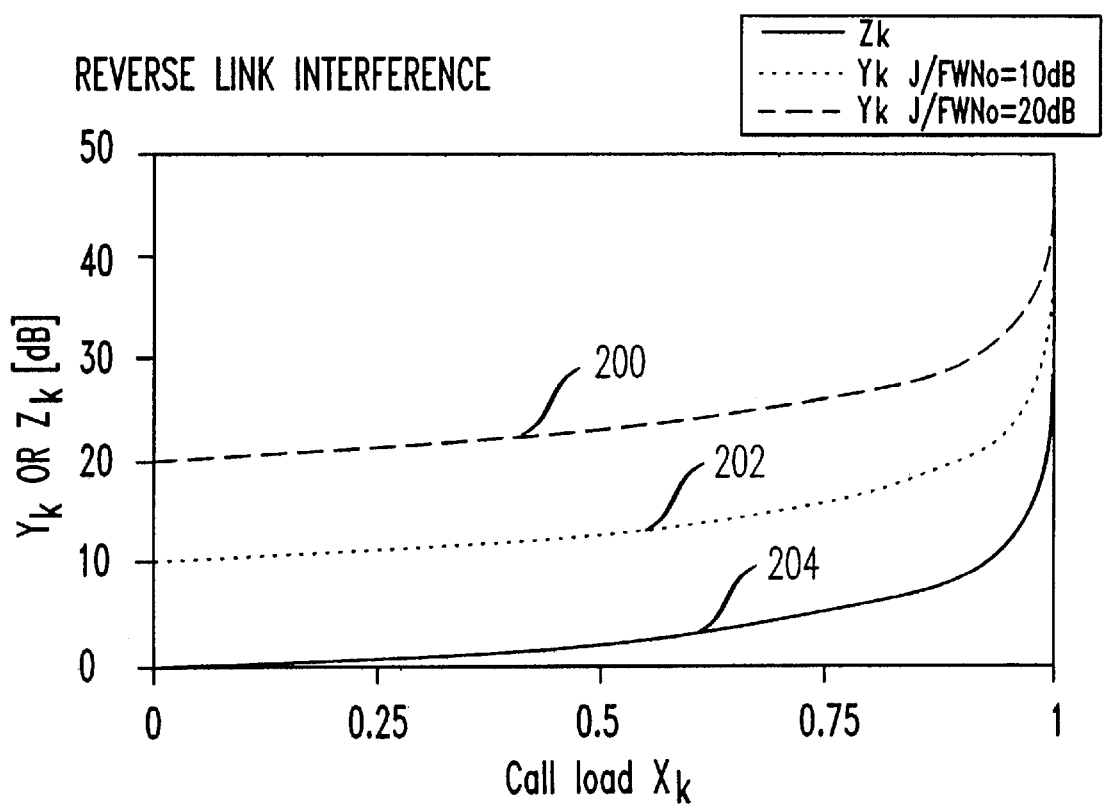
FIG. 2 is graph of call load versus power rise for different values of external jammer signal.

However, when external jammer signals are present and the value of J is not known, equation (6) should not be used to calculate the call load. Instead, the call load is calculated by using equation (5) when J is not known. Referring to FIG. 2, a graph of the power rise ($Y_k$ or $Z_k$) as a function of the call load ($X_k$) is shown. In particular, curve 200 is the graph of the power rise vs. call load with a value of 20 dB for the external jammer signal power (J). Curve 202 is the graph of the power rise with J=10 dB and curve 204 is a graph of the power rise vs. call load for J=0.

Still referring to FIG. 2, for a cellular communication system with a cell k, at a relatively low call load (e.g., $X_k$<0.5), an increase in call load has a relatively low corresponding increase in power, i.e., $Y_k$ (or $Z_k$) as that part of the curve is relatively flat. However, an admission of a new subscriber may shift the call load to a relatively high value (e.g., $X_k$>0.75) resulting in an unacceptably high power rise.

Even though the external jammer signals have no effect on a system's capacity, they will affect the coverage of the communication system such as, for example, the coverage of a base station. The external jammer signal power level can be so high that most of the subscribers are not able to communicate with the system equipment because of interference; the only subscribers who are able to communicate with the system are those subscribers who are located relatively close to the base station. Interference thus affects the coverage (of a cell or a communication system) and not its capacity. The coverage is the area within which communications can occur between a subscriber and system equipment (e.g., a base station). The higher the jammer power J, the smaller the coverage.

Referring again to FIG. 3 and still in step 302, the call load analysis comprises the calculation of a plurality of instantaneous call load values (of equation (5)) which can be done continually, continuously, periodically or aperiodically depending on the particular circumstances (e.g., time of day, location of cell 112) being considered by the system operator. An average value for the call load is calculated from the plurality of instantaneous call load values. It will be readily obvious that the call load value at various instances will fluctuate (rise and fall) and therefore the system operator uses an average of the call load values to assess the cell's ability to provide an acceptable quality of communications to the admitted subscribers. The average can be an algebraic average, a weighted average or any well known technique for statistical averaging. The frequency of the averaging (i.e., how often the averaging is done) is arbitrarily determined by the system operator.

In step 304, the system equipment compares the average call load value to the established threshold value. If the average call load value is substantially equal to or above the established threshold, the method of the present invention moves to step 308 where the system equipment blocks admission requests from subscribers. In step 308, the system has determined that an overload condition exists and therefore, any subscriber requesting admission (or any system page) to cell 112 is not admitted. The system can decide to modify or change the threshold value and thus compare the average call load value to this new threshold value.

Further, because the individual call load value for each admitted subscriber is known by the system equipment, the system equipment identifies those subscribers whose contributions (i.e., individual subscriber call load values) to the average call load value are deemed significant. One example of how such subscribers are identified is to compare their particular contribution to the average call load value to a subscriber threshold value established by the system operator. A significant contribution is one which if removed from a communication system in an overload condition causes the communication system to no longer be in an overload condition or reduces the average call load value to a value which is substantially equal to or below the established threshold value.

The method of how and which subscribers are removed during an overload condition is arbitrarily determined by the system operator. One method of removal is when the system operator assigns a subscriber threshold value to each admitted subscriber and when that subscriber's contribution to the average call load value is substantially equal to or is above that threshold, the subscriber is removed from the system if an overload condition exists. Another method is, during an overload condition, the system operator removes from the communication system those subscribers who were most recently admitted. The identified subscribers are removed from the system to cause the average call load value to fall to a point below the established threshold. A removed subscriber is an admitted subscriber whose ability to communicate with system equipment and/or other subscribers is taken away by the system equipment. A removed subscriber can make a request for admission, but will only be admitted (by the system equipment) in accordance with the method of the present invention. Prior to removing the identified subscribers, the system operator alerts the identified subscribers (with a beep or tone or a special message) to indicate to such subscribers that they will be removed from the system.

Returning to step 304, if the calculated average call load value is below the established threshold, the method of the present invention moves to step 306 whereby system equipment monitor communication channels (e.g., base station 100 monitors reverse links for subscribers assigned to cell 112) for the next subscriber requesting admission (or for the next system page) to the communication system and admit such a subscriber to the communication system. The system equipment monitor the communication channels in accordance with a protocol being followed by the communication system. The protocol is a set of rules and procedures that is part of a well known and well established standard with which many communication systems comply. The protocol, inter alia, defines how communications are initiated, maintained, and terminated (or released) between subscribers and system equipment. A well known protocol for CDMA wireless communication systems is the IS-95 standard.

For cellular communication systems such as an IS-95 CDMA cellular system, the subscribers requesting admission can also be located in other cells. In such a case, the base station equipment of the respective cells have to perform a well known procedure called a handoff. A handoff occurs when control, operation and processing of a subscriber's communication signals are transferred from one base station to another base station. In a CDMA system, each subscriber has a certain unique code with which it is associated. When a handoff occurs, the transferee base station receives from the transferor base station those unique codes and other system information associated with the subscriber being handed off.

From a pragmatic standpoint, not all subscribers—from other cells—requesting admission can be admitted. For CDMA systems, one of the unique codes associated with each subscriber is called a long code mask. One technique for limiting the amount of subscribers that can even be considered for handoffs is to provide a list of long code masks to a base station for subscribers assigned to a neighboring cell of that base station. Neighboring cells are those cells that share at least a portion of their borders. For example, in FIG. 1, cells 110 and 112 are neighboring cells. Thus, base station 100 contains the long code masks for subscriber 118 and other subscribers assigned to cell 110. If subscriber 118 wishes to be handed off to cell 112, subscriber 118 transmits a request to base station 100 which request contains subscriber 11 8's long code mask. Base station 100 confirms that the long code mask received from subscriber 118 is in the list of subscribers that can be considered for a handoff. Once base station 100 confirms that subscriber 118 can be considered for admission, it initiates the handoff procedure with base station 102 and admits subscriber 118 to cell 112. Neighboring base stations exchange subscriber call load values, long code masks and other information via system communication links (not shown in FIG. 1) during the handoff procedure. Also, depending on the preference of the system operator and the protocol being followed, the subscriber call load values can be transferred at other instances and not necessarily during the handoff procedure. In general, the information representing the call load value is packaged and formatted as a block of data and transferred at a particular time; the time and package configuration can be defined to comply with the protocol being followed or can be a new addition to the protocol.

The system operator can decide to admit subscribers from neighboring cells based on a comparison of the average call load value to a particular threshold (distinct from the established threshold value) used only for handoff situations. The particular threshold is also modifiable and can be higher or lower than the established threshold. In other words, the system operator can discriminate between subscribers requesting admission to a cell depending on whether the requesting subscriber is assigned to that cell or is coming from another cell. For example, the system operator may decide to give priority to in-cell subscribers and therefore subscribers from other cells are admitted based on a lower threshold making it more difficult for such subscribers to be admitted. In other circumstances, the subscribers from other cells are given priority.

The above described method of the present invention can be implemented with system equipment (typically located at a base station) such as programmable computer equipment or microprocessor based hardware controlled by firmware. Further, the method of the present invention can be implemented with Application Specific Integrated Circuits (ASIC) or other well known hardware (e.g., transmitters, receivers, storage equipment) of various technologies (e.g., electrical, electronic, optical or a combination thereof) which hardware is configured to calculate instantaneous call load values as per equation (5) and average call load values from the plurality of instantaneous call load values. The hardware is further configured to compare the calculated average call load value to an established threshold and admit a subscriber requesting service based on whether the calculated average call load value is above, substantially equal to or below the established threshold; that is when the average value is below the established threshold the hardware admits the requesting subscriber to the communication system and when the average call load is substantially equal to or above the established threshold the hardware denies the requesting subscriber access to the communication system. The hardware is also configured to include radio circuitry and processing circuitry that can receive $$\frac{E_b}{N_t}$$

values and/or calculate instantaneous call load values for subscribers of a communication system (e.g., subscribers of various cells of a cellular communication system such as a CDMA system) and decide whether to admit (via a handoff procedure depending on the circumstances) such subscribers requesting admission.

We claim:

1. A method for preventing overload conditions in a communication system, the method comprising the steps of:

establishing a threshold value;

performing a call load analysis based on a plurality of instantaneous call load values for subscribers admitted to the communication system and calculating an average call load value for the admitted subscribers, wherein the instantaneous call load values are determined independently of jamming power experienced by the communication system;

comparing the establish threshold value to the average call load value; and admitting to the communication system a subscriber requesting admission to the communication system when the average call load value is below the established threshold value.

2. The method of claim 1 where the established threshold value is based on a call load value that allows the communication system to provide acceptable communications to its subscribers.

3. The method of claim 1 where the established threshold value is modifiable.

4. The method of claim 1 where the instantaneous call load values for the subscribers admitted to the communication system are calculated using the equation $$\sum_{l=1}^{L}\sum_{j=1}^{M_l}\frac{v_{j,l}\left(\frac{E_b}{N_t}\right)_{j,l}^{m}}{\left(\frac{W}{R}\right)_{j,l}+v_{j,l}\left(\frac{E_b}{N_t}\right)_{j,l}^{m}}$$

where $M_l$, is the number of subscribers admitted to the communication system in cell l, j is a subscriber index, $v_{j,l}$ is a voice activity factor for the subscriber j in cell l, $$\left(\frac{E_b}{N_t}\right)_{j,l}^m$$

is a signal to noise ratio for subscriber j in cell l measured at cell m, and $$\left(\frac{W}{R}\right)_{j,l}$$

is a processing gain for subscriber j in cell l which processing gain is a ratio of subscriber j in cell l carrier signal bandwidth (W) to subscriber j in cell l information rate (R); and calculating an average call load from the plurality of call load values.

5. The method of claim 1 where performing a call load analysis further comprises modifying the established threshold value.

6. The method of claim 1 where admitting a subscriber to the communication system farther comprises blocking the admission request of the subscriber thus not admitting the subscriber when the average call load value is substantially equal to or above the established threshold value.

7. The method of claim 1 further comprising removing, from the communication system in an overload condition, the admitted subscribers whose contribution to the average call load is deemed to be significant.

8. The method of claim 7 where the removed subscribers are those subscribers whose particular contributions to the average call load value are each substantially equal to or above a threshold value assigned to that subscriber.

9. The method of claim 7 where the removed subscribers are subscribers most recently admitted to the communication system.

10. A method for preventing overload conditions in a wireless CDMA cellular communication system, the method comprising the steps of establishing a threshold value for a cell m of the communication system;

performing a call load analysis based on a plurality of call load values for subscribers admitted to cell l and calculating an average call load value for the admitted subscribers, wherein the call load values are determined independently of jamming power experienced by cell l;

comparing the established threshold value to the average call load value; and admitting to cell m a subscriber requesting admission to cell m only when the average call load value is below the established threshold value.

11. The method of claim 10 where the established value is based on a determined call load value that allows cell m to provide acceptable communications to its subscribers.

12. The method of claim 10 where the established threshold value is modifiable.

13. The method of claim 10 where the plurality of call load values for the subscribers admitted to cell t are calculated using the equation $$\sum_{l=1}^{L}\sum_{j=1}^{M_l}\frac{v_{j,l}\left(\frac{E_b}{N_t}\right)_{j,l}^m}{\left(\frac{W}{R}\right)_{j,l}+v_{j,l}\left(\frac{E_b}{N_t}\right)_{j,l}^m}$$

where $M_l$ is the number of subscribers admitted to cell l, j is a subscriber index, $v_{j,l}$ is a voice activity factor for the subscriber j in cell l, $$\left(\frac{E_b}{N_t}\right)_{j,l}^m$$

is a signal to noise ratio for subscriber j in cell l measured at cell m, and $$\left(\frac{W}{R}\right)_{j,l}$$

is a processing gain for subscriber j in cell l which processing gain is a ratio of subscriber j in cell l carrier signal bandwidth (W) to subscriber j in cell l information rate (R); and calculating an average call load from the plurality of call load values.

14. The method of claim 10 where performing a call load analysis further comprises updating the average call load value.

15. The method of claim 10 where admitting a subscriber further comprises blocking the admission request of the subscriber, thus not admitting the subscriber to cell m, when the average call load value is substantially equal to or above the established threshold value.

16. The method of claim 10 further comprising removing, from cell m in an overload condition, the admitted subscribers whose contributions to the average call load are deemed to be significant.

17. The method of claim 16 where the removed subscribers are those subscribers having contributions to the average call load value each of which is substantially equal to or is above a threshold value assigned to that subscriber.

18. The method of claim 16 where the removed subscribers are those subscribers most recently admitted to cell m.

19. The method of claim 10 where admitting a subscriber further comprises admitting a requesting subscriber from a neighboring cell with the use of a handoff procedure.

20. The method of claim 19 where admitting a subscriber with the use of a handoff procedure comprises receiving from the neighboring cell a subscriber call load value for the requesting subscriber, comparing the average call load value to a particular threshold value distinct from the established threshold value and admitting the requesting subscriber to cell m when the average call load value is below the particular threshold value.

21. The method of claim 20 where the subscriber call load value is packaged and transferred at a particular time, the time and package configuration being in accordance with a protocol being followed by the CDMA system.

22. The method of claim 20 where the particular threshold value is higher than the established threshold value.

23. The method of claim 20 where the particular threshold value is lower than the established threshold value.

24. A method for preventing overload conditions in a communication system, the method comprising the steps of:

establishing a threshold value;

performing a call load analysis based on a plurality of instantaneous call load values for subscribers admitted to the communication system and calculating an average call load value for the admitted subscribers, wherein the instantaneous call load values are calculated using the equation $$\sum_{l=1}^{L}\sum_{j=1}^{M_l} \frac{v_{j,l}\left(\frac{E_b}{N_t}\right)_{j,l}^m}{\left(\frac{W}{R}\right)_{j,l} + v_{j,l}\left(\frac{E_b}{N_t}\right)_{j,l}^m}$$

where $M_l$ is the number of subscribers admitted to the communication system in cell l, j is a subscriber index, $v_{j,l}$ is a voice activity factor for the subscriber j in cell l, $$\left(\frac{E_b}{N_t}\right)_{j,l}^m$$

is a signal to noise ratio for subscriber j in cell l measured at cell m, and $$\left(\frac{W}{R}\right)_{j,l}$$

is a processing gain for subscriber j in cell l which processing gain is a ratio of subscriber j in cell l carrier signal bandwidth (W) to subscriber j in cell l information rate (R); and the average call load value is calculated from the plurality of call load values;

comparing the establish threshold value to the average call load value; and admitting to the communication system a subscriber requesting admission to the communication system when the average call load value is below the established threshold value.

25. A method for preventing overload conditions in a wireless CDMA cellular communication system, the method comprising the steps of:

establishing a threshold value for a cell m of the communication system;

performing a call load analysis based on a plurality of call load values for subscribers admitted to cell l and calculating an average call load value for the admitted subscribers, wherein the call load values are calculated using the equation $$\sum_{l=1}^{L}\sum_{j=1}^{M_l} \frac{v_{j,l}\left(\frac{E_b}{N_t}\right)_{j,l}^m}{\left(\frac{W}{R}\right)_{j,l} + v_{j,l}\left(\frac{E_b}{N_t}\right)_{j,l}^m}$$

where $M_l$ is the number of subscribers admitted to cell l, j is a subscriber index, $v_{j,l}$ is a voice activity factor for the subscriber j in cell l, $$\left(\frac{E_b}{N_t}\right)_{j,l}^m$$

is a signal to noise ratio for subscriber j in cell l measured at cell m, and $$\left(\frac{W}{R}\right)_{j,l}$$

is a processing gain for subscriber j in cell l which processing gain is a ratio of subscriber j in cell l carrier signal bandwidth (W) to subscriber j in cell l information rate (R); and the average call load value is calculated from the plurality of call load values;

comparing the established threshold value to the average call load value; and admitting, to cell m a subscriber requesting admission to cell m only when the average call load value is below the established threshold value.

26. A method for preventing overload conditions in a wireless CDMA cellular communication system, the method comprising the steps of:

establishing a threshold value for a cell m of the communication system;

performing a call load analysis and calculating an average call load value for subscribers admitted to cell l;

comparing the established threshold value to the average call load value; and admitting to cell m a subscriber requesting admission to cell m only when the average call load value is below the established threshold value;

wherein the step of admitting a subscriber further comprises admitting a requesting subscriber from a neighboring cell with the use of a handoff procedure comprising the steps of:

receiving from the neighboring cell a subscriber call load value for the requesting subscriber;

comparing the average call load value to a particular threshold value distinct from the established threshold value; and admitting the requesting subscriber to cell m when the average call load value is below the particular threshold value.

* * * * *